US012567158B2

(12) United States Patent
Yu et al.

(10) Patent No.: US 12,567,158 B2
(45) Date of Patent: Mar. 3, 2026

(54) APPARATUS AND METHOD WITH IMAGE PROCESSING AND TARGET TRACKING

(71) Applicant: SAMSUNG ELECTRONICS CO., LTD., Suwon-si (KR)

(72) Inventors: Jiaqian Yu, Beijing (CN); Yiwei Chen, Beijing (CN); Changbeom Park, Suwon-si (KR); Hyunjeong Lee, Suwon-si (KR); Byung In Yoo, Suwon-si (KR); Qiang Wang, Beijing (CN); Siyang Pan, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 544 days.

(21) Appl. No.: 18/077,465

(22) Filed: Dec. 8, 2022

(65) Prior Publication Data

US 2023/0186492 A1 Jun. 15, 2023

(30) Foreign Application Priority Data

Dec. 10, 2021 (CN) .......................... 202111506258.5
Nov. 3, 2022 (KR) ......................... 10-2022-0145196

(51) Int. Cl.
*G06T 7/246* (2017.01)
(52) U.S. Cl.
CPC ................................... *G06T 7/248* (2017.01)

(58) Field of Classification Search
CPC ..................................................... G06T 7/248
See application file for complete search history.

(56) References Cited

U.S. PATENT DOCUMENTS

| 9,576,183 B2 * | 2/2017 | Reitmayr ................... G06T 7/73 |
| 2014/0028712 A1 | 1/2014 | Keating et al. |
| 2019/0222776 A1 * | 7/2019 | Carter .................... H04N 5/272 |
| 2019/0258878 A1 * | 8/2019 | Koivisto ................ G06V 10/46 |
| 2020/0192464 A1 | 6/2020 | Wetzler et al. |
| 2020/0380701 A1 * | 12/2020 | Buibas ................. G06V 40/103 |

FOREIGN PATENT DOCUMENTS

| KR | 10-2019-0023389 A | | 3/2019 | |
| KR | 20190023389 A | * | 3/2019 | ............. G06T 7/246 |

* cited by examiner

*Primary Examiner* — Pinalben Patel
(74) *Attorney, Agent, or Firm* — NSIP Law

(57) ABSTRACT

An apparatus and method with tracking a target are provided. A method includes determining whether data augmentation is to be used to augment a target tracking process, based on determining that data augmentation is to be used, performing the target tracking process based on an augmented image area obtained by the data augmentation on an image area, and outputting a tracking result generated by the target tracking process.

19 Claims, 15 Drawing Sheets

100A

100B

200A

200B

200C

APPARATUS AND METHOD WITH IMAGE PROCESSING AND TARGET TRACKING

CROSS-REFERENCE TO RELATED APPLICATIONS

This application claims the benefit under 35 USC § 119(a) of Chinese Patent Application No. 202111506258.5 filed on Dec. 10, 2021, in the China National Intellectual Property Administration, and Korean Patent Application No. 10-2022-0145196 filed on Nov. 3, 2022, in the Korean Intellectual Property Office, the entire disclosures of which are incorporated herein by reference for all purposes.

BACKGROUND

1. Field

The following description relates to tracking a target in images.

2. Description of Related Art

Visual target tracking is a fundamental building block of various tasks in computer vision. Target tracking is difficult when a target and a background change continuously in unknown ways.

In general, data augmentation in computer vision is one of the techniques commonly used to generate various data sets and more generalized algorithms. For example, there are target tracking algorithms based on a Siamese network.

FIGS. 1A and 1B illustrate, respectively, an example of training and inference of a Siamese local recommendation network model of the related art.

As shown in FIG. 1A, a Siamese network-based target tracking algorithm 100A may perform rough data augmentation on a template image and a search area in a training operation. Unifying augmentation methods in the Siamese network-based target tracking algorithm may prevent a model from being generalized, undermining processing of unknown data changes or drifting data distributions, which occurs in an inference operation.

However, as shown in FIG. 1B, the Siamese local recommendation network 100B may not perform data augmentation on an input image in the inference operation, so drifting data augmentation is less likely to return to matching a training data distribution.

In addition, when an existing model is evaluated by using Expected Calibration Error (ECE), a confidence score output by a target tracking algorithm may not accurately reflect the actual uncertainty of the algorithm, leading to an overconfident prediction.

In addition to the Siamese network-based target tracking algorithm shown in FIG. 1, the same issue may exist in similar target tracking algorithms (e.g., a Discriminative Model Prediction (DiMP) tracking algorithm). Therefore, existing target tracking technology may lack robustness due to insufficient or unadaptable data augmentation.

In addition, data distribution drift may lead to performance degradation of a subsequent image processing, for example, an increasing possibility of a target loss in target tracking and a decreasing classification accuracy in image classification.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a target tracking method includes determining whether data augmentation is to be used to augment a target tracking process, based on determining that data augmentation is to be used, performing the target tracking process based on an augmented image area obtained by the data augmentation on an image area, and outputting a tracking result generated by the target tracking process.

The determining the data augmentation may be to be used may include obtaining a first original tracking result by performing the target tracking process based on the image area, and determining whether the data augmentation may be to be used according to the first original tracking result.

The method may include outputting, as the tracking result, a first original tracking result obtained from the target tracking process based on the image area, when it is determined that the data augmentation is not to be used.

The first original tracking result may include a first original predicted position of a tracked target and a first original confidence score corresponding to the first original predicted position of the tracked target, and the determining of whether the data augmentation may be to be used may be based on the first original confidence score.

The determining of whether the data augmentation may be to be used, according to the first original confidence score, may include when the first original confidence score may be within a first preset score range, determining that the data augmentation may be to be used.

The performing of the target tracking process based on the augmented image area may include obtaining N tracking results by performing the target tracking process based on N augmented image areas, and determining a first augmented tracking result by comparing the N tracking results to one another, wherein the N augmented image areas may be obtained by augmenting data on the image area by using N data augmentation processing methods, respectively.

The outputting of the tracking result may include when a first augmentation confidence score included in the first augmented tracking result may be within a second preset score interval, outputting the first augmented tracking result as the tracking result, and when the first augmented confidence score included in the first augmented tracking result may be not within the second preset score interval, outputting a first original tracking result as the tracking result.

The image area may include a template image area may further include a tracked target within a frame image or a search area within the frame image.

When the image area is a first search area positioned in a t-th frame image and the first augmented tracking result is output as the tracking result, the method may include: obtaining a second original tracking result corresponding to a second search area of a t+1th frame image by performing the target tracking process based on the second search area; augmenting data on the second search area through a data augmentation processing method corresponding to the first augmented tracking result; determining a second augmented tracking result corresponding to the second search area by performing the target tracking based on the augmented second search area; and determining a final tracking result corresponding to the second search area, from the second original tracking result and the second augmented tracking result.

When the second augmented tracking result is determined to be the final tracking result corresponding to the second search area, augmenting data on a third search area in a t+2th frame image may be done through the data augmentation processing method corresponding to the first augmented tracking result and determining a third augmented tracking result corresponding to the third search area to be a final tracking result corresponding to the third search area by performing the target tracking process based on the augmented third search area; and when the second original tracking result is determined to be the final tracking result corresponding to the second search area, the method may include determining a final tracking result corresponding to the third image search area by performing the target tracking based on an original third search area.

When the image area is a template image area and the first augmented tracking result corresponding to the first search area in a t-th frame image is output as the tracking result, the method may include: obtaining a second original tracking result corresponding to a second search area of a t+1th frame image by performing the target tracking based on the second search area and the template image area; determining a second augmented tracking result corresponding to the second search area by performing the target tracking based on the second search area and an augmented template image area; and determining a final tracking result corresponding to the second search area, from the second original tracking result and the second augmented tracking result, wherein the augmented template image area is obtained by augmenting data on the template image area through a data augmentation processing method corresponding to the first augmented tracking result.

When the second original tracking result is determined to be the final tracking result corresponding to the second search area, a final tracking result corresponding to a third search area in a t+2th frame image may be determined by performing the target tracking process based on the third search area and the template image area, and when the second augmented tracking result is determined to be the final tracking result corresponding to the second search area, determining the final tracking result corresponding to the third search area by performing the target tracking process based on the third search area and the augmented template image area.

The N augmented image areas may be obtained by augmenting data on the image area, using the N data augmentation processing methods, respectively, through obtaining an augmented image area corresponding to the image area by augmenting the image area, using augmentation chains for each of the N data augmentation processing methods, respectively.

The obtaining of the augmented image area corresponding to the image area by augmenting the image area using the augmentation chains may include performing an augmentation processing on the image area using each augmentation chain, and obtaining the augmented image area corresponding to the image area by performing weighted combination output results of the respective augmentation chains.

At least one of the augmentation chains may be randomly selected from among augmentation chain candidates.

Each of the augmentation chain candidates may be linked to at least one augmentation primitive among a plurality of augmentation primitives.

The augmentation primitives comprise a contrast primitive, a color primitive, a brightness primitive, a sharpness primitive, a clipping primitive, a blur primitive, and a translation primitive.

An image processing method may include obtaining N augmented image areas by augmenting data on an image area of an image, using N data augmentation processing methods, respectively, and selecting a target image area among the N augmented image areas, according to a preset criterion.

The method of claim 18, further may further include performing target tracking based on the target image area.

A target tracking apparatus may include one or more processors, storage hardware storing instructions configured to, when executed by the one or more processors, cause the one or more processors to determine whether a target tracking process may be to be augmented with data augmentation, when determined that the data augmentation may be to be used, perform the data augmentation on an image area of an image, and perform the target tracking process based on an augmented image area obtained by the data augmentation and to output a tracking result of the target tracking process.

Other features and aspects will be apparent from the following detailed description, the drawings, and the claims.

Figure 1A:
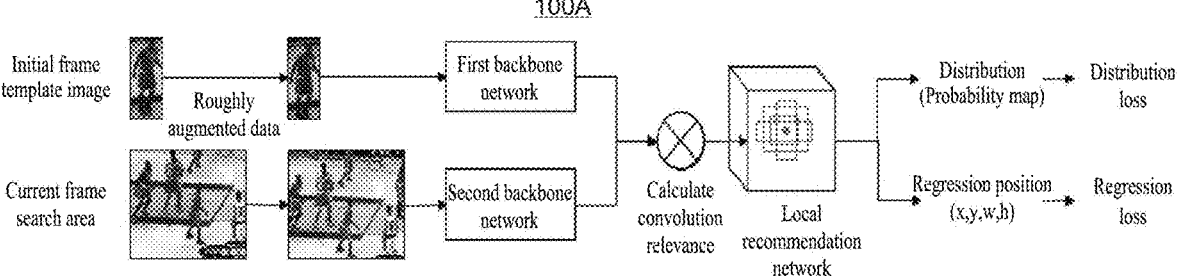
FIG. 1A illustrates an example of training a Siamese local recommendation network model of a related art.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

In practical applications, while visual (image-based) target tracking is being performed, there may be changes that interfere with tracking. In general, such data changes may include, but are not limited to:

1) Lighting change: a lighting change may generally change a visual feature of a tracking target. When lighting of a template image in an initial frame is distant from an illumination source illuminating the tracking target, in a subsequent video frame, if the tracking target has moved close to the illumination source, a tracking algorithm may have difficulty identifying a most appropriate matching position of the tracking target among different candidate positions in a search area.

2) Scale translation: changing distance between a tracking target and a camera collecting a video sequence thereof may prevent a scale of the target from being uniformly maintained in the video sequence. A tracking algorithm may need to maintain a consistency of a feature represented by the tracking target at various scales.

3) Rotation: similar to a lighting change, rotation may also cause a difference in object properties. In particular, a rotation may lead to a different surface of a three-dimensional object appearing in the field of view (FOV), thus introducing a new visual feature.

4) Deformation: similar to the lighting change and the rotation, deformation of a non-rigid object may also cause a change in object properties, thus increasing the difficulty in tracking the object.

5) Blur: camera and/or object movement during video capture may often cause blurring in the video. A blurry object and/or a blurry background may significantly change a data feature of a subsequent video frame compared to an initial frame.

6) Occlusion: when a tracked object is obscured by another object, some features of the target object disappear from view. Accordingly, a matching calculation between the remaining features of the target object and template features may generally cause an error, which may lead to an inaccurate target tracking. In particular, during extended tracking, a tracked target may be completely obscured, and a system may consider the tracked target as disappearing according to a matching result. When the occlusion ends and the tracked target reappears, the system may need to reposition the tracked target.

7) Out of FOV: similar to occlusion, in a video, a tracked target often disappears out of the field view. When a portion of a tracked target is out of the FOV, the portion of the tracked target remaining in view becomes incomplete, thus increasing a difficulty in tracking. During extended tracking, a tracked target, as a whole, may disappear out of the FOV. When the tracked target reappears in the FOV, the system may need to reposition the original tracked target.

Figure 2A:
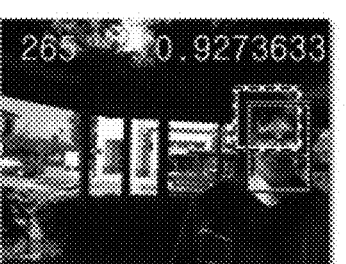
FIG. 2A illustrates an example of data change.
Figure 2B:
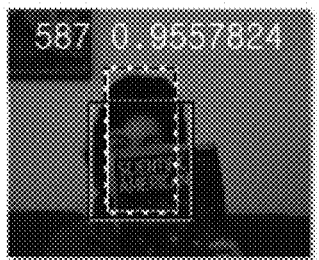
FIG. 2B illustrates an example of data change.
Figure 2C:
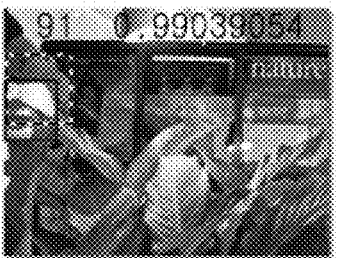
FIG. 2C illustrates an example of data change.

FIGS. 2A, 2B, and 2C illustrate lighting change 200A, occlusion 200B, and out of FOV 200C in data change, respectively.

In each of FIGS. 2A, 2B, and 2C, a solid-line bounding box represents an actual value (ground truth) and a dashed-line bounding box represents an algorithm prediction value.

Lighting change, occlusion, out of FOV, and the like may cause a difference in a feature between a tracked target and a background and drift of data distribution, which may affect the accuracy of a target tracking algorithm.

In FIGS. 2A, 2B, and 2C, the integer values in the upper left corners are the number of frames in video sequences represented by the respective frames shown in FIGS. 2A, 2B, and 2C. In addition, in FIGS. 2A, 2B, and 2C, the floating-point values of the upper right corners are confidence scores of predicted positions corresponding to the dashed-line bounding boxes in FIGS. 2A, 2B, and 2C, respectively. Confidence scores may range from 0 to 1, or may be proportional to (or based on) predicted probabilities (e.g., inference probabilities). When a tracked target changes significantly (as illustrated in the examples of FIGS. 2A to 2C), a prediction frame (e.g., predicted bounding box) may deviate commensurately, so that the confidence score of a predicted position may be low and tracking difficulty may increase.

One technique is to adopt a data augmentation method to generate various data sets and to provide more generalizable algorithms, but a method of stacking more types and intensities of data augmentation on a training data set may have a limited effect on addressing the above issues.

Some embodiments described herein may enable a target tracking method based on mixed data augmentation. Some methods may identify a video frame in which data distribution drift occurs in an inference operation, use mixed data augmentation selection to select an appropriate mixed data augmentation method for tracking a target, and augment a video frame in which data distribution drift occurs to remove or reduce the data distribution drift (or effect thereof) while correcting/providing a data augmentation method for a subsequent frame in which the target is tracked.

In addition, some embodiments may provide an acceleration mechanism of a target tracking method. The acceleration mechanism may improve the speed of executing a target tracking method by performing data augmentation on a template image area instead of on a search area. Therefore, some target tracking methods described below may be effective in tracking a data change which continuously occurs and is unknown in a target and/or a background.

Hereafter, examples of target tracking methods are described with reference to FIGS. 3 to 11.

Figure 3:
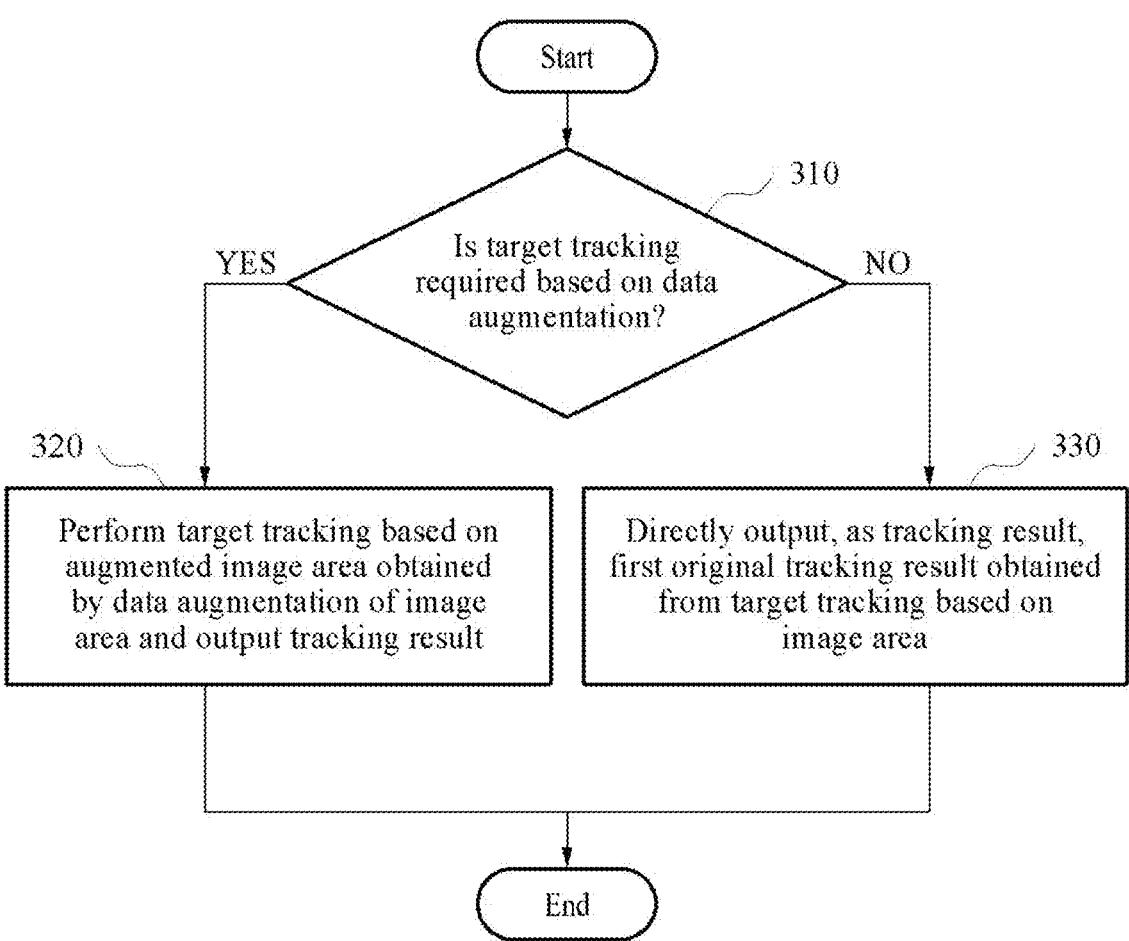
FIG. 3 illustrates an example of target tracking based on data augmentation, according to one or more embodiments.
Figure 4:
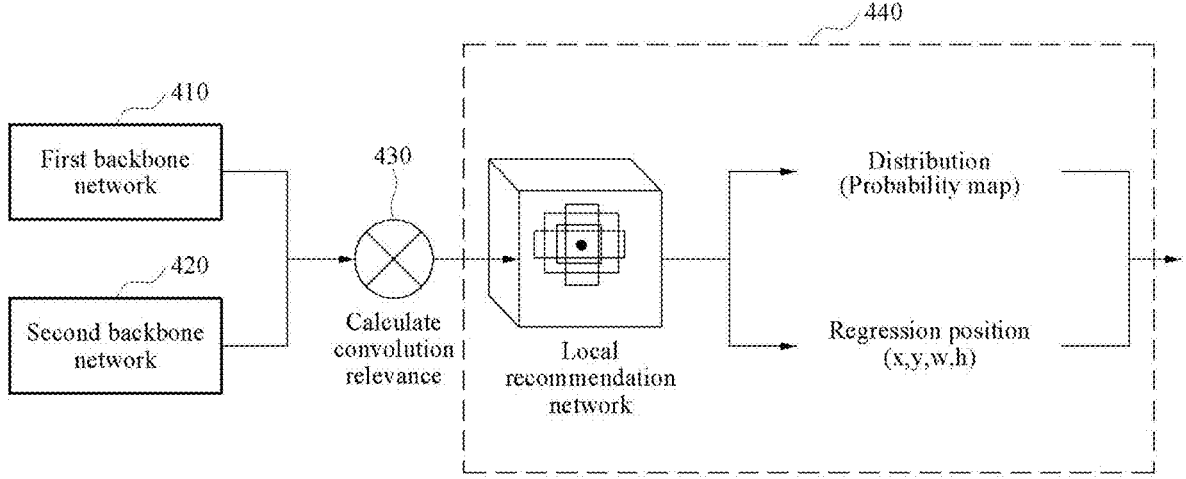
FIG. 4 illustrates an example of a network model used for the target tracking of FIG. 3, according to one or more embodiments.

FIG. 3 illustrates an example target tracking process based on data augmentation, according to one or more embodiments. FIG. 4 illustrates an example network model used for target tracking of FIG. 3, according to one or more embodiments. Although target tracking methods according to an example and a target tracking model are described with reference to FIGS. 3 and 4, the present disclosure is not limited thereto. Herein, any target tracking model applicable to the target tracking methods of the present disclosure, such as a Discriminative Model Prediction (DiMP) tracking algorithm, may be used.

Referring to FIG. 3, in operation 310, the example target tracking method may determine whether target tracking based on data augmentation is to be invoked. Specifically, in operation 310, the target tracking method may perform target tracking based on an image area to obtain a first original tracking result and determine whether data augmentation is to be invoked according to the first original tracking result.

Figure 1B:
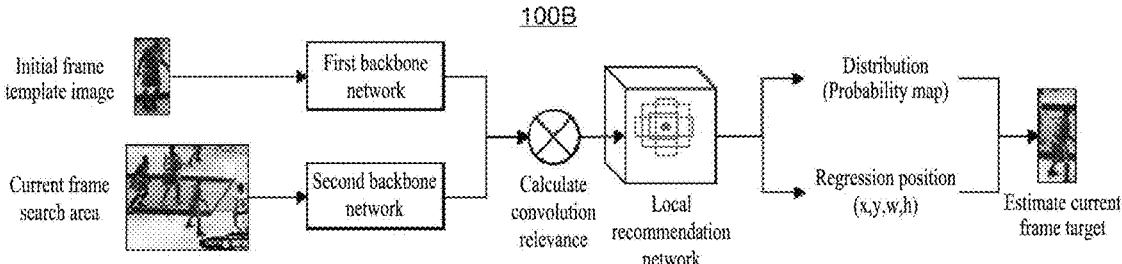
FIG. 1B illustrates an example of inference of a Siamese local recommendation network model of a related art.

Specifically, a target tracking model of FIG. 4 may be a trained Siamese local recommendation network model, for example, as described with reference to FIG. 1. The target tracking model of FIG. 4 may include a first backbone network module 410, a second backbone network module 420, a convolution module 430, and a local recommendation network module 440.

The target tracking model may input, to the first backbone network module 410, a template image area corresponding to a tracked target to extract, by the first backbone network module 410, a template feature and input, to the second network module 420, an image search area (i.e., a search area) in a t-th frame image of an input video to extract, by the second network module 420, a search area feature. Then, the target tracking model may generate a map at a specific size by performing a full convolution operation on the template feature and the search area feature through the convolution module 430. Then, the local recommendation network module 440 may generate k anchor points at each location in the map at the specific size. The target tracking model may select an anchor point with the highest confidence through a classification branch (output) of the local recommendation network module 440 and obtain a final predicted position of the tracked target in a current frame with the prediction of a regression branch of the anchor point. Moreover, the local recommendation network module 440 may use the confidence of the anchor point in the classification branch as a confidence score of the final predicted position.

Details of target tracking for a template image area and an image search area of a frame image using a Siamese network recommendation network may be found elsewhere.

When the target tracking method determines whether target tracking based on data augmentation is to be invoked, the target tracking method may determine a first search area in a template image area corresponding to the tracked target and a first search area in a t-th frame image (t is a natural number) to be values input to the two backbone networks 410 and 420 of the target tracking model, respectively, and may obtain a first original tracking result by performing target tracking through the target tracking model. Then, the target tracking method may determine whether target tracking based on data augmentation is to be invoked, according to the first original tracking result.

The first original tracking result may include a first original predicted position of the tracked target and a first original confidence score corresponding to the first original predicted position of the tracked target. In operation 310, determining whether data augmentation is to be used for target tracking, according to the first original tracking result, may be based on the first original confidence score. Specifically, determining whether target tracking based on data augmentation is to be invoked may be based on whether the first original confidence score is within a first preset interval (a probability/score range).

The target tracking method may define a relationship between the first original confidence score and the first preset interval and determine whether there is drift in the data distribution of the first search area. Here, the first preset interval may be, for example, [0.7, 0.9], but the present disclosure may not be limited thereto. For example, the first preset section may be [0.6, 0.85].

When the first original confidence score is lower than the first preset interval, for example, the first original confidence score is less than 0.7, the tracked target may already disappear at this point, and the target tracking method may determine that the target does not need to be re-tracked based on data augmentation.

When the first original confidence score is within the first preset interval, the target tracking method may determine that data augmentation is to be invoked. That is, since, in this case, the data distribution in the first search area drifts, target tracking according to data augmentation may be helpful.

When the first original confidence score is greater than the first preset interval, the target tracking method may determine the first original tracking result to be a tracking result of the tracked target (i.e., the original tracking result is deemed sufficient). For example, when the first original confidence score is greater than 0.9, the target tracking method may determine that data augmentation is not to be invoked since target tracking is already sufficient and the data distribution of the first search area does not drift. Where it is determined in operation 310 that data augmentation is not to be invoked, the target tracking method may directly output, as a tracking result of the tracked target, the first original tracking result obtained from the target tracking, based on the image area. Thereafter, the target tracking method may process a next frame image (i.e., the t+1th frame image) of FIG. 3 starting from operation 310.

In the above process, the target tracking method may determine a relationship between the first preset interval and the confidence score of the predicted position of the tracked target (obtained by the target tracking with respect to the image area) and thus identify a video frame in which there may be data distribution drift ("determine a relationship" may be, for example, determining whether the confidence score falls withing the first preset interval/range). Accordingly, the target tracking method may determine whether there is actual data distribution drift in the video frame based on a subsequent second preset interval.

Where the target tracking method determines in operation 310 that data augmentation is to be invoked, the target tracking method performs the target tracking based on an augmented image area obtained by data augmentation of an image area and outputs a tracking result in operation 320.

Here, the image area may be a search area within a frame image or a template image area including the tracked target in the frame image.

Following is an example implementation of operation 320 of FIG. 3. In the following description, "search area" (a first search area, a second search area, or a third search area) has the same meaning as "image area" and the phrases may be used interchangeably.

Specifically, operation 320 of performing the target tracking based on an augmentation image area (i.e., an augmented search area) obtained by data augmentation on an image area (i.e., the first search area) may include obtaining N tracking results by performing the target tracking, based on N augmented search areas. The N augmented search areas may be obtained by augmenting data on the first search area by using the data augmentation processing methods, respectively. This is further described with reference to FIG. 5.

Figure 5:
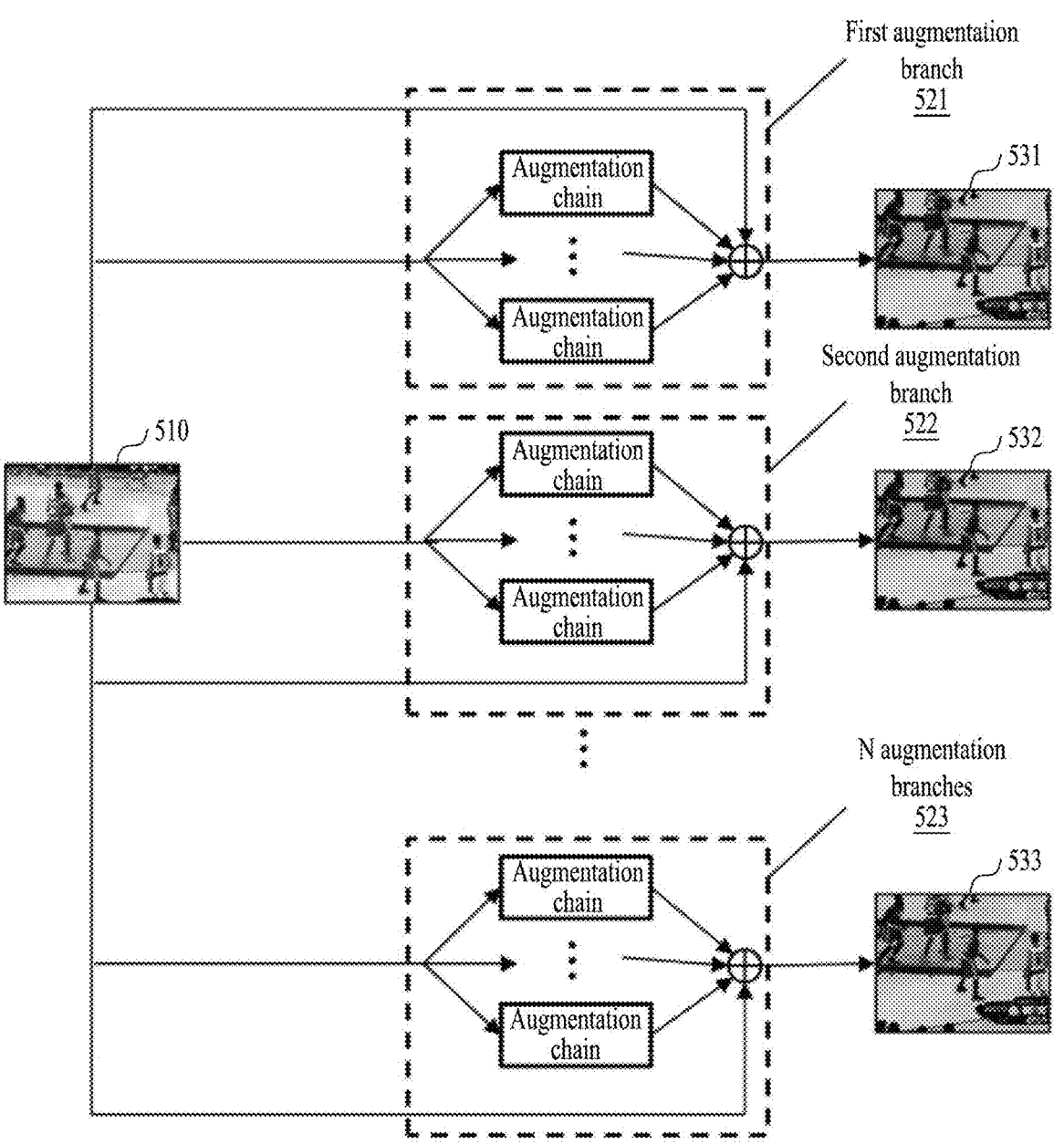
FIG. 5 illustrates an example of data augmentation, according to one or more embodiments.

FIG. 5 illustrates an example of processing data augmentation, according to one or more embodiments. A first search area 510 may be processed according to each of N data augmentation processing methods. In this case, each data augmentation processing method may be an augmentation branch. That is, the first search area 510 may be input to each of N augmentation branches 521, 522, and 523. As shown in FIG. 5, each augmentation branch may include at least one augmentation chain randomly selected, for example, from among augmentation chain candidates.

Figure 6:
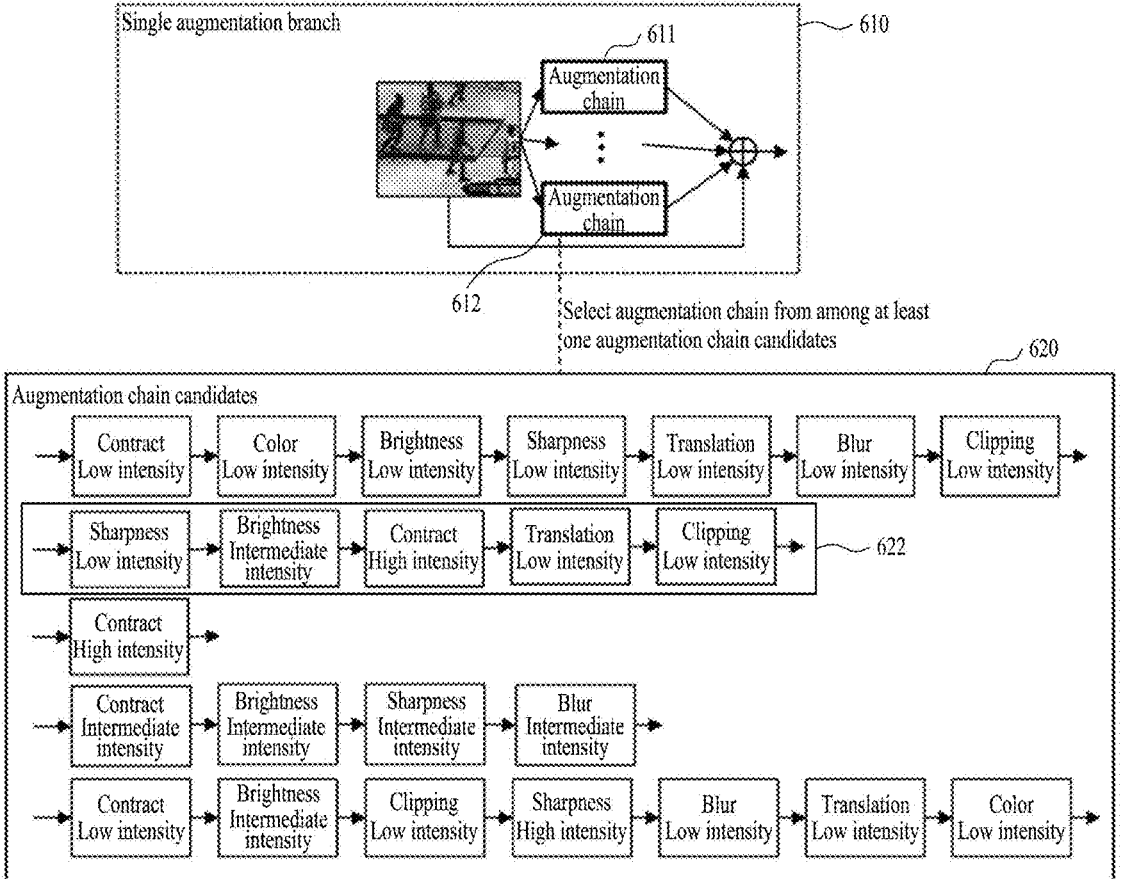
FIG. 6 illustrates an example configuration of an augmentation chain, according to one or more embodiments.

FIG. 6 illustrates an example configuration of an augmentation chain. Augmentation chains 611 and 612 of a single augmentation branch 610 shown at the top of FIG. 6 may both be randomly (or otherwise) selected from among augmentation chain candidates 620 shown at the bottom of FIG. 6. Each augmentation chain candidate among the augmentation chain candidates 620 may be configured to connect to (link to) at least one augmentation primitive among augmentation primitives. The augmentation primitives may be respective neural networks, image signal processing (ISP) modules, or the like. An augmentation chain may include links to the augmentation primitives rather than copies (e.g., links to networks/modules in a library), thus allowing the augmentation primitives to be re-used, in various orderings/selections, among the augmentation chain candidates.

According to an example, the augmentation primitives may include contrast, color, brightness, sharpness, clipping, blur, and translation. For example, an augmentation primitive may be an image filter. In addition, the intensity or other setting(s) of each augmentation primitive (where applicable) may be randomly selected. That is, a configuration method of the augmentation chain may be highly flexible, so that any given augmentation chain may include any of the augmentation primitives or an augmentation primitive at a specific quantity of a specific range. The augmentation intensity of each augmentation primitive is not limited.

For example, a second augmentation candidate chain 622 in FIG. 6 may include "sharpness (low intensity)", "brightness (medium intensity)", "contrast (high intensity)", "translation (low intensity)" and "clipping (low intensity)", which may be serially connected in that order. Alternatively, the second augmentation candidate chain 622 may be configured to include only three connections of "sharpness (low intensity)", "brightness (medium intensity)", and "contrast (high intensity)". However, these are only examples and the augmentation chain candidates may be connected to and configured with varying augmentation primitives having any augmentation intensity/setting.

Accordingly, N augmentation image areas 531, 532, and 533 may be obtained by augmenting the first search area 510, using the N data augmentation processing methods, respectively, based on an operation of obtaining an augmented search area by augmenting the first search area 510 with each of the data augmentation processing methods, each of which includes at least one augmentation chain (any number of the data augmentation processing methods may be used). An augmentation chain may include just one primitive.

Specifically, if a given augmentation processing method (augmentation branch) having given augmentation chains (one is possible) is used to augment the first search area 510 with an augmentation image area (i.e., an augmented search area), each of the given augmentation chains may generate a respective chain output and an output result for the given augmentation processing method (augmentation branch) may be obtained as a weighted combination of the chain outputs to obtain the augmented search area. For example, where the first augmentation branch 521 shown in FIG. 5 is taken as an example, the first search area 510 may be input to the first augmentation branch 521. Each augmentation chain included in the first augmentation branch 521 may augment the first search area 510 by generating a respective augmentation chain output. Then, a combiner may perform weighted combination of the augmentation chain outputs. The first augmentation branch 521 may obtain an augmented search area as a result output from the combiner. The other augmentation branches 522 and 523 may obtain N−1 augmented search areas through a process similar to that of the first augmentation branch 521 and may thus finally obtain N augmented search areas.

After acquiring the N augmented search areas, the target tracking method may input, to a target tracking model as illustrated in FIG. 4, each of the N augmented search areas paired with a template image area and may thus obtain N tracking results. That is, the target tracking method may obtain N predicted positions of the tracked target and N confidence scores respectively corresponding to the N predicted positions.

In addition, in the target tracking method, operation 320 of the target tracking based on the augmented search area (obtained by data augmentation on the first search area) may include determining an optimal tracking result, among the N tracking results, to be (serve as) a first augmented tracking result. Specifically, the optimal tracking result may be determined/selected (among the N tracking results) according to confidence scores of the respective N tracking results. That is, a tracking result having the highest confidence score among the N tracking results may be selected to be the optimal/final tracking result.

As described above, the target tracking methods may effectively address data distribution drift since the target tracking methods may select an appropriate data augmentation processing method from among various data augmentation processing methods, and may do so based on a data augmentation selection strategy, and thus may augment data on a video frame in which the data distribution drift occurs. In addition, the target tracking methods may be used to output a more accurate predicted position of the tracked target in subsequent tracking of the target (e.g., in a same video sequence). In addition, the data augmentation processing method that is identified as the most appropriate may be used for other subsequent image processing modules as well. For example, such a data augmentation processing method (e.g., by augmentation chain(s) of the selected augmentation branch) may be applied to an image segmentation, for example, which might be in a same image processing pipeline performing the target tracking.

In addition, in the target tracking methods, operation 320 of outputting a tracking result may include determining a relationship between the first augmented tracking result and a second preset interval, and determining which one of the first augmented tracking result and the first original tracking result may be selected as a target tracking result in the t-th (i.e., current) frame image.

The target tracking method may determine the second preset interval using the first original confidence score. For example, where the first original confidence score is a, the second preset interval (numeric range, e.g., probability/score range) may be [a−b, a+b], where b is a natural number less than a (e.g., a probability). However, this is only an example. The second preset interval may be determined with other techniques, for example, based on the first original confidence score, based on a moving statistical window, etc.

Then, some embodiments of the target tracking method may determine a relationship between the second preset interval and the first augmentation confidence score of the first augmented tracking result. Where the first augmentation confidence score in the first augmented tracking result is within the second preset interval, the target tracking method may determine that it is effective to augment the first search area with a data augmentation processing method corresponding to the first augmented tracking result (i.e., data distribution adjustment). Accordingly, the target tracking method may output the first augmented tracking result as a tracking result. That is, the target tracking method may determine the predicted position of the first augmented tracking result as a final predicted position of the tracked target in the t-th frame image.

When the first augmentation confidence score in the first augmented tracking result is out of the second preset interval, it may be determined that it is not effective to augment the first search area according to a data augmentation processing method corresponding to the first augmentation tracking (i.e., data distribution adjustment). Accordingly, the first original tracking result may be outputted as a tracking result. That is, the first original predicted position may be determined to be a final predicted position of the tracked target in the t-th frame image, and a next frame image (i.e., a t+1 frame image) is then processed in operation 310 of FIG. 3.

After determining a video frame in which data distribution drift may exist according to the first preset interval, some embodiments may determine whether the video frame actually has data distribution drift through the second preset interval and perform a following processing as a reflection of a poor tracking status of the video frame. At the same time, a current frame may be augmented by selecting an appropriate data augmentation method through operations described above to obtain a more accurate predicted position of the tracked target.

In addition, where the first augmented tracking result is finally output as the tracking result of the t-th frame image, use the data augmentation processing method of the t-th frame image may be used to correct a data augmentation method of a subsequent image frame of the t-th frame image.

Figure 7:
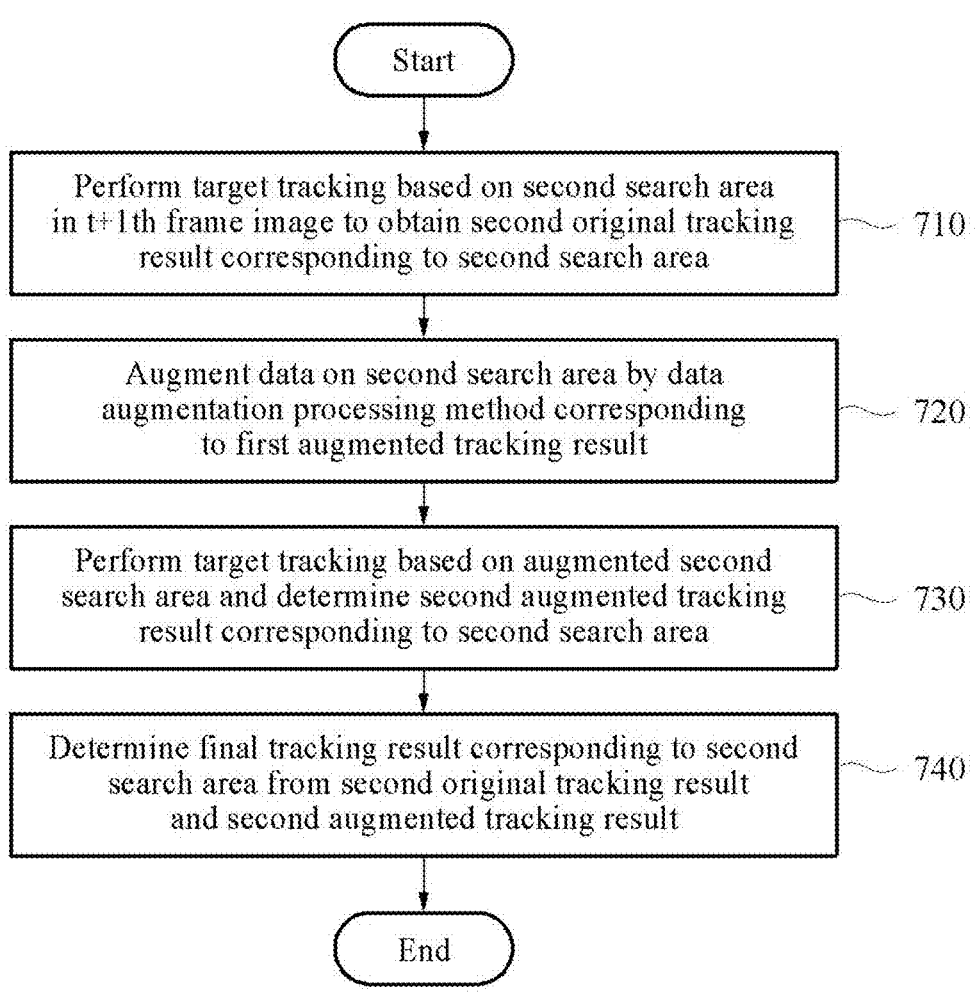
FIG. 7 illustrates an example of correcting a data augmentation method for a subsequent frame of a current frame, according to one or more embodiments.
Figure 8:
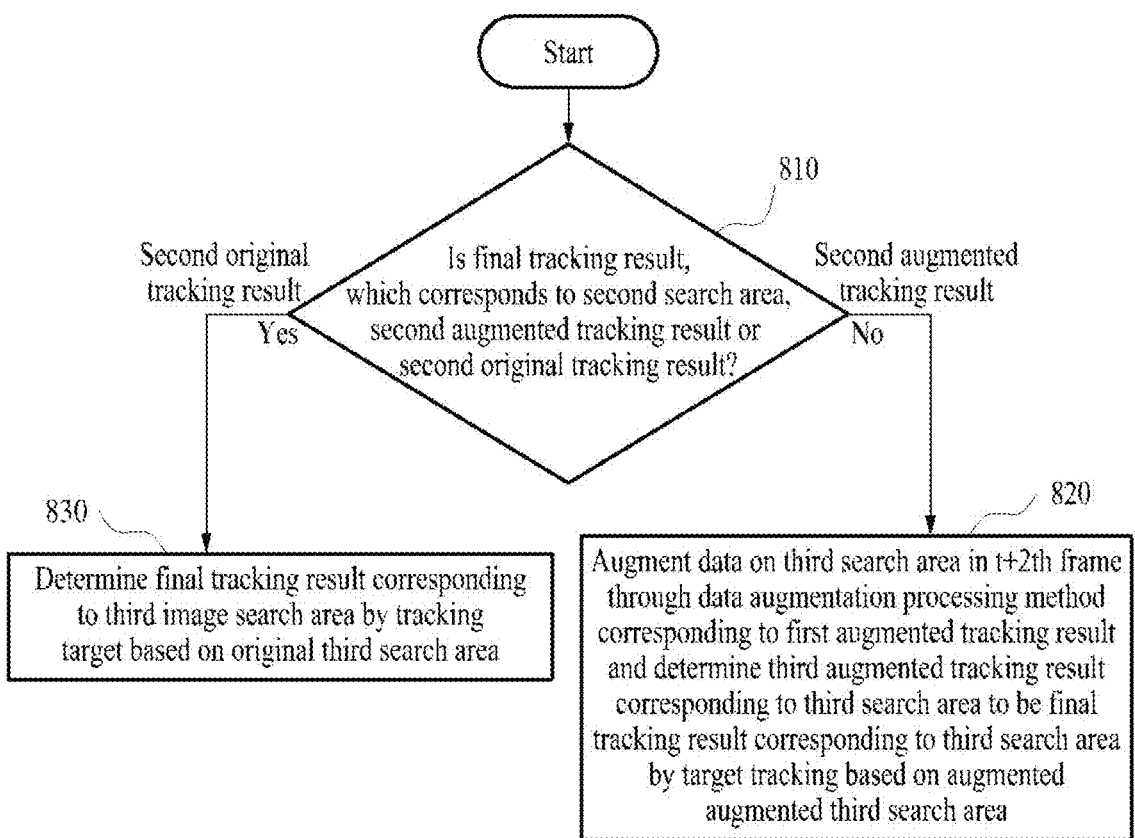
FIG. 8 illustrates an example of target tracking for a next frame of a subsequent frame with a tracking result using a corrected data augmentation method, according to one or more embodiments.

FIG. 7 illustrates an example of correcting a data augmentation method for a subsequent frame of a current frame, according to one or more embodiments. FIG. 8 illustrates an example of target tracking for a next frame of a subsequent frame with a tracking result using a corrected data augmentation method, according to one or more embodiments. Referring to FIGS. 7 and 8, a subsequent process on a subsequent frame may correct data augmentation of a subsequent frame when a first augmented tracking result is output as a tracking result.

Referring to FIG. 7, when a first augmented tracking result is output as a tracking result, data augmentation processing may be performed on a t+1th frame image immediately after a t-th frame image.

Target tracking may be performed based on a second search area in the t+1th frame image to obtain a second original tracking result corresponding to the second search area in operation 710.

Specifically, the center position of a tracked target in the t-th frame image may be determined according to a predicted position included in the first augmented tracking result. A specific image area in the t+1th frame image may be clipped with the second search area according to a predetermined size ratio, based on the center position of the tracked target, and then the second search area and a template image area may be input to a target tracking model to track the target and thus obtain a second original tracking result corresponding to the second search area.

Then, the data on the second search area may be augmented by a data augmentation processing method corresponding to the first augmented tracking result in operation 720.

Specifically, since a tracking result of the tracked target determined for the t-th frame image may be determined by using the data augmentation processing method with the highest confidence score (among N data augmentation processing methods), the data augmentation processing method may most likely augment the data of the second search area, where the distribution of the t-th frame image data is similar to the distribution of the t+1th frame image data. Techniques for using the data augmentation processing method are described above.

Target tracking may be based on the augmented second search area and thus a second augmented tracking result corresponding to the second search area may be determined in operation 730.

Specifically, the augmented second search area together with the template image area may be inputted to the target tracking model as shown in FIG. 4, and then a second augmented tracking result corresponding to the second search area may be obtained. Techniques for determining the tracking result according to the augmented search area and the template image area by a target tracking model are described with reference to FIG. 3.

A final tracking result corresponding to the second search area may be determined from the second original tracking result and the second augmented tracking result, in operation 740.

The confidence score of the second original tracking result may be compared to the confidence score of the second augmented tracking result. When the confidence score of the second original tracking result is greater than or equal to the confidence score of the second augmented tracking result, the second original tracking result may be determined to be a final tracking result corresponding to the second search area, that is, a predicted position of the second original tracking result may be determined to be a final predicted position of the tracked target in the t+1th frame image. Where the confidence score of the second augmented tracking result is greater than the confidence score of the second original tracking result, the second augmented tracking result may be determined to be the final tracking result corresponding to the second search area (i.e., determine the predicted position of the second augmented tracking result to be the final predicted position of the tracked target in the t+1th frame image).

Since the data augmentation method of the t+1th frame image may be corrected according to the data augmentation method of the t-th frame, the data augmentation method more suitable for the t+1th frame may be effectively identified. Therefore, target tracking may have increased robustness. In addition, after determining the final tracking result of the t+1th frame image, target tracking methods described with reference to FIG. 3 may also determine the tracking result of the tracked target in the t+2th frame image. This is described with reference to FIG. 8.

Referring to FIG. 8, in operation 810, target tracking methods may determine whether a final tracking result corresponding to a second search area is a second augmented tracking result or a second original tracking result.

In operation 820, when the second augmented tracking result is determined to be the final tracking result corresponding to the second search area, data on a third search area in the t+2th frame may be augmented through a data augmentation processing method corresponding to the first augmented tracking result and a third augmented tracking result (corresponding to the third search area) may be determined to be a final tracking result corresponding to the third search area by target tracking based on an augmented third search area.

Specifically, the third search area in the t+2th frame image may be determined according to a predicted position of the tracking target in the t+1th frame image. Determining the third search area and augmenting data on the third search area may be similar to operations 710 and 720 of FIG. 7. After obtaining the augmented third search area, the augmented third search area and a template image area may be inputted to a target tracking model to track the target and, based on the input, a third augmented tracking result (corresponding to the third search area) may be determined to be a final tracking result corresponding to the third search area. Such a process may be similar to operation 730 of FIG. 7.

When the second original tracking result is determined to be the final tracking result corresponding to the second search area, in operation 830, a final tracking result (corresponding to the third image search area) may be determined by tracking the target based on the original third search area. That is, the target may be tracked by inputting the original third search area and the template image area to the target tracking model, and a final tracking result corresponding to the third image search area may be determined. Such a process is similar to operation 710 of FIG. 7.

After processing operations of FIG. 8, the data augmentation method of the t+2th frame image may be corrected by processing the t+2th frame image according to the same final processing method as the final processing method of the t+1th frame image, so that target tracking may more effectively identify a data augmentation method suitable for the t+2th frame, which may increase the robustness of the target tracking. In addition, after the processing of the t+2th frame image is completed, target tracking may be performed for a next frame image immediately after the t+2th frame, starting from operation 310 of FIG. 3.

Although operation 320 may involve, for example, the image area for data augmentation being the search area within the image frame, the amount of computation may increase when data increases for a search area each time. Accordingly, hereinafter, a variation example of operation 320 is described in detail where an image area for data augmentation is a template image area. That is, in the following description, data on a template image area may be augmented according to N data augmentation processing methods with no more data augmentation on the search area, so that each augmented template image to which a data augmentation processing is applied may be used whenever target tracking is performed, which may greatly lower the amount of calculation increase the speed of target tracking.

Referring to the description of FIG. 3, when determined that data augmentation for tracking is to be invoked, in operation 320, the target may be tracked based on an augmented image area (i.e., an augmented template image) obtained by data augmentation for an image area (i.e., a template image area) and a corresponding tracking result may be outputted. In the following description, "template image area" is synonymous with "image area" and the phrases are used interchangeably.

In operation 320, target tracking based on the augmented image area (i.e., the augmented template image area) obtained by data augmentation for the image area (i.e., the template image area) may include obtaining N tracking results by tracking the target based on N augmented template image areas and determining an optimal tracking result among the N tracking results to be a first augmented tracking result. In this case, the N augmented template image areas may be obtained by augmenting data on each of the template image areas, using the N data augmentation processing methods. This is described further with reference to FIG. 9.

Figure 9:
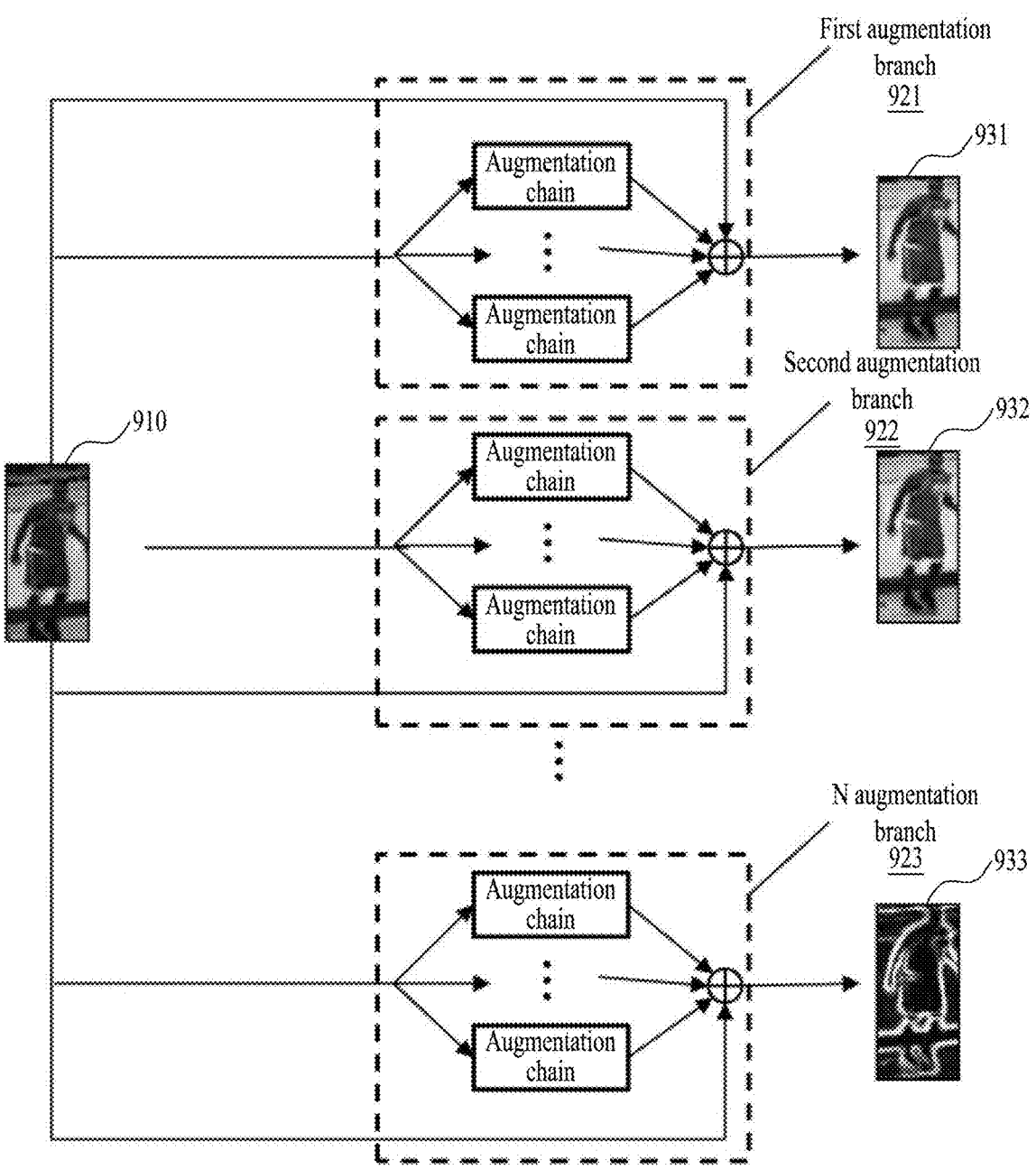
FIG. 9 illustrates another example of data augmentation, according to one or more embodiments.

FIG. 9 illustrates another example of processing data augmentation, according to one or more embodiments. Augmentation processing shown in FIG. 9 may be similar to augmentation processing shown in FIG. 5. A difference therebetween is that the input of FIG. 5 is the search area 510 and the outputs of FIG. 5 are the N augmented search areas 531, 532, and 533 with the data augmented, whereas an input of FIG. 9 is a template image area 910 and the outputs of FIG. 9 are N augmented template image areas 931, 932, and 933 with the data augmented.

In addition, obtaining the N augmented template image areas 931, 932, and 933 by processing data augmentation on the template image area 910 (using N data processing methods) may be performed before or after operation 310.

Data augmentation for the template image area 910 may be similar to data augmentation for the search area 510; the data augmentation process for the search area 510 is described in detail above.

In addition, when a target tracking method tracks the target, using the N augmented template image areas, the target may be tracked by inputting, to a target tracking model, each of the N augmented template image areas that is paired with the first search area of the t-th frame image and N tracking results may be thus obtained. Then, a tracking result, among the N tracking results, determined to be an optimal tracking result, may serve as a first augmented tracking result. Here, target tracking may use the N augmented template images instead of the N augmented search areas, thus speeding up execution of target tracking. Specifically, each tracking result may include a predicted position and a confidence score of the predicted position. Accordingly, a tracking result with the highest confidence among the N tracking results may be taken/selected as the optimal tracking result, that is, the first augmented tracking result.

A data augmentation selection strategy may be used to select an appropriate data augmentation processing method from among various data augmentation processing methods and augment data on a video frame in which data distribution drift occurs, thereby effectively addressing the data distribution drift and outputting a more accurate predicted position of the tracked target in a subsequent target tracking. At the same time, an augmentation processing method that is identified as the most appropriate may be used for other image processing modules as well. For example, such an augmentation processing method may apply to image segmentation.

In addition, operation 320 of outputting the tracking result may include determining a relationship between the first augmented tracking result and the second preset interval and selecting, as a target tracking result in the t-th frame, either the first augmented tracking result or the first original tracking result according to a determined result.

The second preset interval may be determined using the first original confidence score. For example, when the first original confidence score is a, the second preset interval may be [a−b, a+b], for example, but the second preset interval may be any reasonable interval determined based on the first original confidence score.

Then, a relationship between the first augmentation confidence score of the first augmented tracking result and the second preset interval may be determined.

Based on the first augmentation confidence score in the first augmented tracking result being within the second preset interval, a template image area may be augmented according to a data augmentation processing method corresponding to the first augmented tracking result. Accordingly, target tracking may involve outputting the first augmented tracking result as a tracking result. That is, the predicted position of the first augmented tracking result may be determined to be the final predicted position of the tracked target in the t-th frame image.

When the first augmentation confidence score in the first augmented tracking result is out of the second preset interval, it may not be effective to augment the template image area according to the data augmentation processing method corresponding to the first augmentation tracking. Accordingly, the first original tracking result may be outputted as the tracking result. That is, target tracking may include determining the first original predicted position to be the final predicted position of the tracked target in the t-th frame image; a next frame image (i.e., the t+1 frame image) may then be processed in operation 310 of FIG. 3.

Target tracking methods may select an optimal augmented template image area through the operations described above and thus obtain a more accurate predicted position of the tracked target.

In addition, a data augmentation method of frames subsequent to the t-th frame image (e.g., the t+1th frame image and the t+2th frame image) may be corrected from an optimal augmented template image area selected from among the N augmented template image areas with respect to the t-th frame image. Such a correction may enable a data augmentation method suitable for the subsequent frames to be identified more effectively, thus increasing the robustness of the target tracking.

Figure 10:
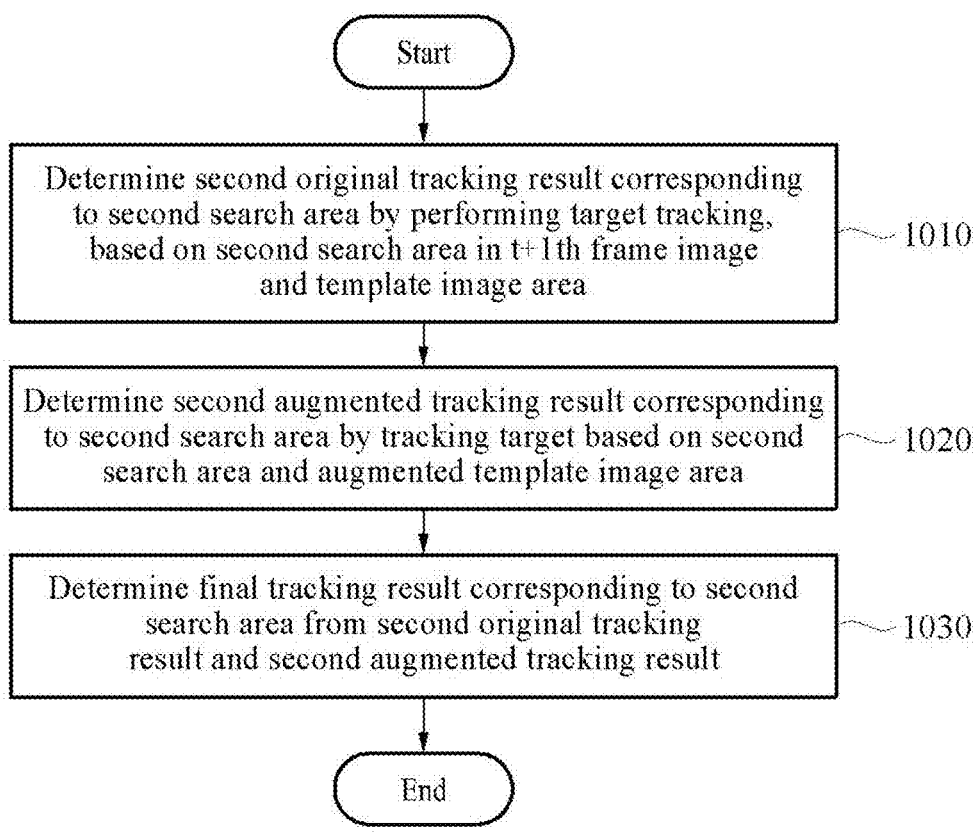
FIG. 10 illustrates another example of correcting a data augmentation for a subsequent frame of a current frame, according to one or more embodiments.
Figure 11:
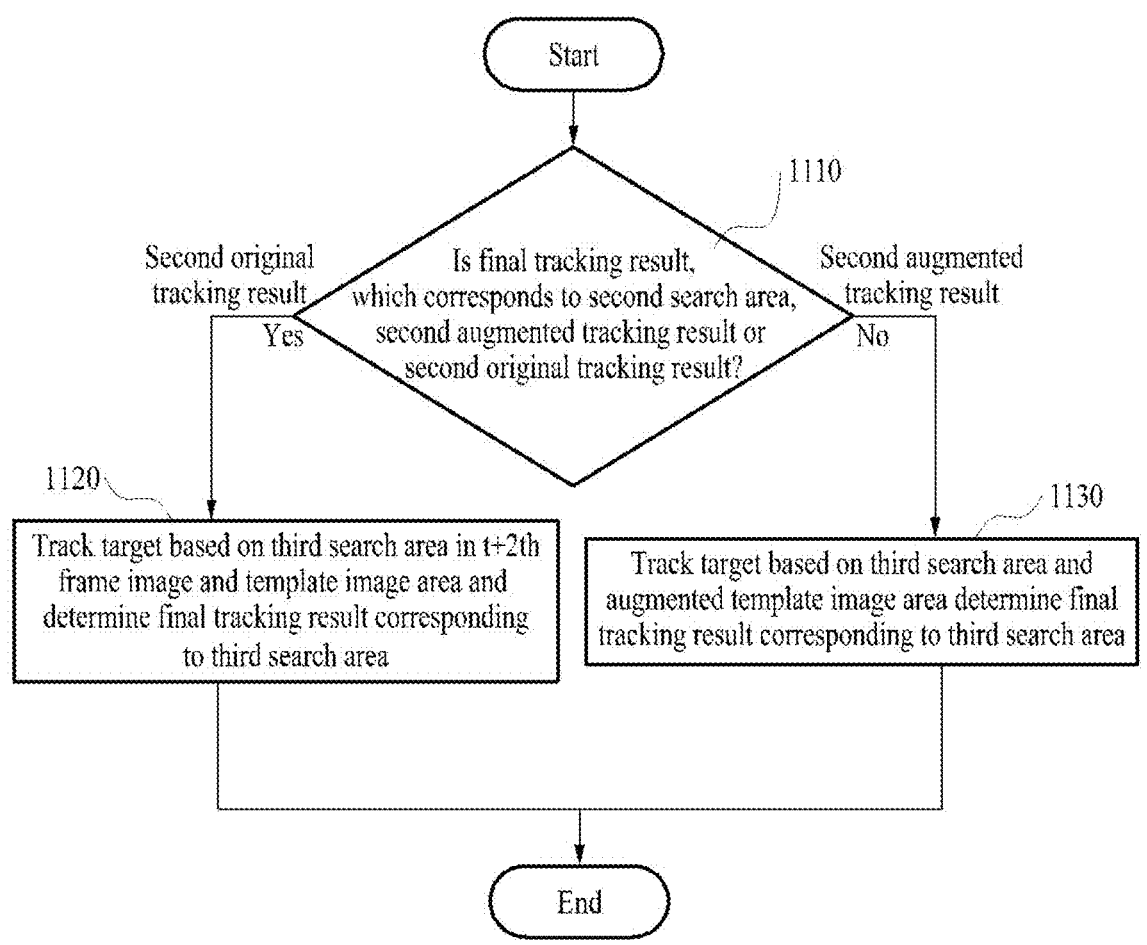
FIG. 11 illustrates another example of target tracking for a next frame of a subsequent frame with a tracking result using a corrected data augmentation, according to one or more embodiments.

FIG. 10 illustrates another example of correcting a data augmentation method for a subsequent frame to a current frame, according to one or more embodiments. FIG. 11 illustrates another example of target tracking for a next frame of a subsequent frame with a tracking result using a corrected data augmentation method, according to one or more embodiments. Referring to FIGS. 10 and 11, processing of a subsequent frame may correct a data augmentation method of the subsequent frame when a first augmented tracking result is output as a tracking result.

Referring to FIG. 10, when a first augmented tracking result corresponding to a first search area in a t-th frame image is output as a tracking result, a target tracking method may perform a tracking correction on a t+1th frame image immediately after the t-th frame image.

In operation 1010, a second original tracking result corresponding to a second search area may be determined by performing target tracking, based on the second search area in the t+1th frame image and a template image area.

Specifically, target tracking may involve determining the center position of a tracked target in the t-th frame image according to a predicted position included in the first augmented tracking result. A specific image area may be clipped in the t+1th frame image with the second search area according to a predetermined size ratio, with the center position of the tracked target at the center. The second search area and the template image area may then be input to a target tracking model to track the target and thus obtain a second original tracking result corresponding to the second search area.

Then, target tracking may include, in operation 1010, determining a second augmented tracking result corresponding to the second search area by tracking the target based on the second search area and based on an augmented template image area. In this case, the augmented template image area may be obtained by augmenting data on the template image area through a data augmentation processing method corresponding to the first augmented tracking result. Specifically, the target tracking method may input, to the target tracking model, the second search area and the augmented template image area to track the target, thereby determining a second augmented tracking result corresponding to the second search area.

Then, in operation 1030, a final tracking result corresponding to the second search area may be determined from the second original tracking result and the second augmented tracking result.

Specifically, the confidence score of the second original tracking result may be compared to the confidence score of the second augmented tracking result. The second original tracking result may be determined to be a final tracking result corresponding to the second search area, when the confidence score of the second original tracking result is greater than or equal to the confidence score of the second augmented tracking result. That is, the predicted position of the second original tracking result may be determined to be a final predicted position of the tracked target in the t+1th frame image.

When the confidence score of the second augmented tracking result is greater than the confidence score of the second original tracking result, a second augmented tracking result may be determined to be the final tracking result corresponding to the second search area. That is, target tracking may include determining the predicted position of the second augmented tracking result to be a final predicted position of the tracked target in the t+1th frame image.

After determining the final predicted position in the t+1th frame image through the above method, the target tracking method may further track and correct the t+2th frame image, as described next with reference to FIG. 11.

Referring to FIG. 11, operation 1110 may involve determining whether the final tracking result corresponding to the second search area is to be the second augmented tracking result or is to be the second original tracking result.

In operation 1120, when the second original tracking result is determined to be the final tracking result corresponding to the second search area, the target may be tracked based on a third search area in the t+2th frame image and a template image area; a final tracking result corresponding to the third search area may be determined. In this case, the template image area may be an original template image area without data augmentation processing.

Specifically, target tracking may include determining the third search area in the t+2th frame image, according to a predicted position of the tracked target in the t+1th frame image. Determining the third search area and tracking the target according to the third search area and the template image area may be similar to that of operation 1010 of FIG. 10.

In operation 1130, when the second augmented tracking result is determined to be the final tracking result corresponding to the second search area, the target may be tracked based on the third search area and an augmented template image area, so that the final tracking result corresponding to the third search area may be determined. In this case, the augmented template image area may be obtained by augmenting data on an original template image area according to an augmentation processing method corresponding to the second augmented tracking result. Specifically, the target may be tracked by inputting the third search area together with the augmented template image area to the target tracking model, thereby determining a final tracking result corresponding to the third search area.

After processing operations of FIG. 11, target tracking may include tracking the target in the t+2th frame image according to the original template image area used at the time of tracking the target in the t+1th frame, the original template image area the same as the augmented template image area, or the augmented template image area. In addition, a next frame image may be processed, starting from operation 310, immediately after processing the t+2th frame.

The target tracking method may not augment data on a search area but may augment data on a template image area according to N data augmentation processing methods, thus using each augmented template image area, to which data augmentation processing is applied, whenever target tracking is performed, which may greatly reduce the amount of calculations.

Figure 12:
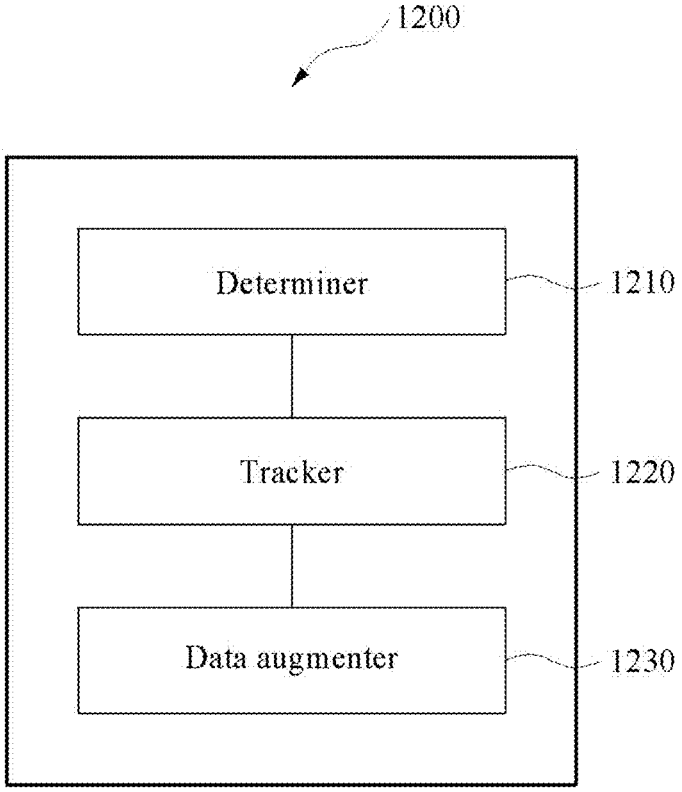
FIG. 12 illustrates an example configuration of a target tracking apparatus, according to one or more embodiments.

FIG. 12 illustrates an example configuration of a target tracking apparatus, according to one or more embodiments.

Referring to FIG. 12, a target tracking apparatus 1200 may include a determiner 1210 and a tracker 1220. The determiner 1210 may determine whether target tracking is required based on data augmentation.

Where the tracker 1220 determines that target tracking is required based on data augmentation, the tracker 1220 may track a target based on an augmented image area obtained by augmenting data on an image area and may output a tracking result.

In addition, the target tracking apparatus 1200 may further include a data augmenter 1230.

The data augmenter 1230 may obtain N augmented image areas by augmenting data on an image area, using the N data augmentation processing methods, respectively.

When the tracker 1220 tracks the target based on the augmented image area obtained by data augmentation for the image area, the tracker 1220 may track the target based on the N augmented image areas to obtain N tracking results and determine an optimal tracking result among the N tracking results to be a first augmented tracking result.

Target tracking methods described above may be executed by the target tracking apparatus 1200 shown in FIG. 12, and details related to operations performed by each component of FIG. 12 may be referred to in the descriptions of FIGS. 3 to 11. In addition, divisions or units of the target tracking apparatus 1200 are only examples and functions may have different architectures and configurations. In addition, the target tracking apparatus 1200 may include other components, such as an image pre-processing device, a storage device, and the like.

Figure 13:
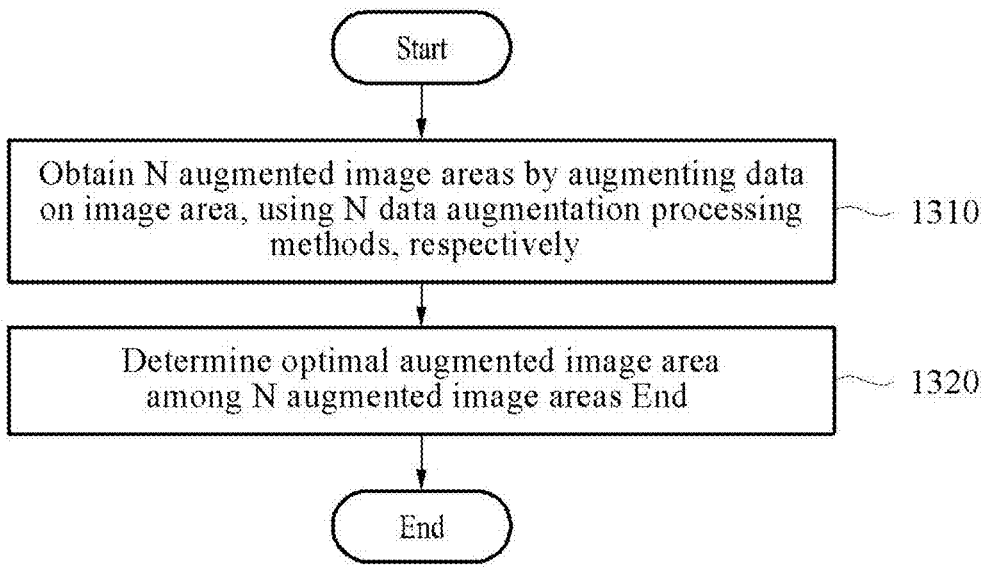
FIG. 13 illustrates an example of an image processing process, according to one or more embodiments.

FIG. 13 illustrates an example of an image processing process, according to one or more embodiments. Referring to FIG. 13, an image processing method may obtain N augmented image areas by augmenting data on an image area, using N data augmentation processing methods, respectively, in operation 1310. In addition, the image area may be a part or all of a frame image. For example, the image area may be a template image area or a search area in which target tracking is performed in a frame image.

Specifically, operation 1310 may obtain an augmented image area by augmenting the image area for each data augmentation processing method, using at least one augmentation chain. As shown in FIG. 5, the image processing method may process the image area according to each of the N data augmentation processing methods. That is, the image area may be input to N augmentation branches, and each of the augmentation branches may include at least one augmentation chain randomly selected from augmentation chain candidates.

As shown in FIG. 6, the augmentation chains 611 and 612 of the single augmentation branch 610 shown at the top of FIG. 6 may both be randomly selected from among the augmentation chain candidates 620 shown at the bottom of FIG. 6. Each of the augmentation chain candidates 620 may be linked to at least one augmentation primitive among augmentation primitives.

According to an example, the augmentation primitives (e.g., filters) may include contrast, color, brightness, sharpness, clipping, blur, and translation. In addition, the intensity of an augmentation primitive may be randomly selected (where applicable). As such, a configuration method of the augmentation chain may be flexible, allowing the use of all augmentation primitives or the use of a specific quantity of augmentation primitives in a specific range. Also, the augmentation intensity of an augmentation primitive may be set otherwise.

For example, a second augmentation candidate chain 622 in FIG. 6 may include "sharpness (low intensity)", "brightness (medium intensity)", "contrast (high intensity)", "translation (low intensity)" and "clipping (low intensity)", which may be connected in order. Alternatively, the second augmentation candidate chain 622 may be configured to include only three connections of "sharpness (low intensity)", "brightness (medium intensity)", and "contrast (high intensity)". However, the present disclosure is not specifically limited thereto, and the augmentation chain candidates may be connected and configured with augmentation primitives having any augmentation intensity.

Specifically, the image processing method may perform augmentation processing on an image area, using each of at least one augmentation chain and then perform weighted combination on an output result of the at least one augmentation chain under random parameters to obtain an augmented image area and may variously implement data augmentation. For example, where the first augmentation branch 521 is taken as an example, the image area may be input to the first augmentation branch 521 shown in FIG. 5. In addition, each of the at least one augmentation chain included in the first augmentation branch 521 may perform augmentation processing for the image area. Then, the combiner may perform weighted combination on an augmentation result output from the at least one augmentation chain, using random parameters. The first augmentation branch 521 may obtain an augmented image area with the augmentation result output from the combiner. For the other augmented branches 522 and 523, N–1 augmented image areas may be obtained through a process similar to that of the first augmentation branch 521 and N augmented image areas may be finally obtained.

The image processing method may determine an optimal augmented image area among the N augmented image areas, in operation 1320.

Specifically, the image processing method may determine an optimal augmented image area among the N augmented image areas according to various preset criteria. For example, the image processing method may determine the optimal augmented image area according to a process of determining the optimal tracking result described above with reference to FIG. 3. That is, the image processing method may obtain N tracking results by inputting, to a target tracking model, each of the N augmented image areas that is paired with a template image area and may determine a tracking result having the highest confidence score among the N tracking results and then determine an augmented image area corresponding to the tracking result to be an optimal augmented image area. However, the present disclosure is not limited thereto, and any method capable of determining an optimal augmented image area from N augmented image areas may be applied to the present disclosure. At the same time, a data augmentation processing method corresponding to the determined optimal augmented image area may also be used in other processing modules, such as image segmentation.

Figure 14:
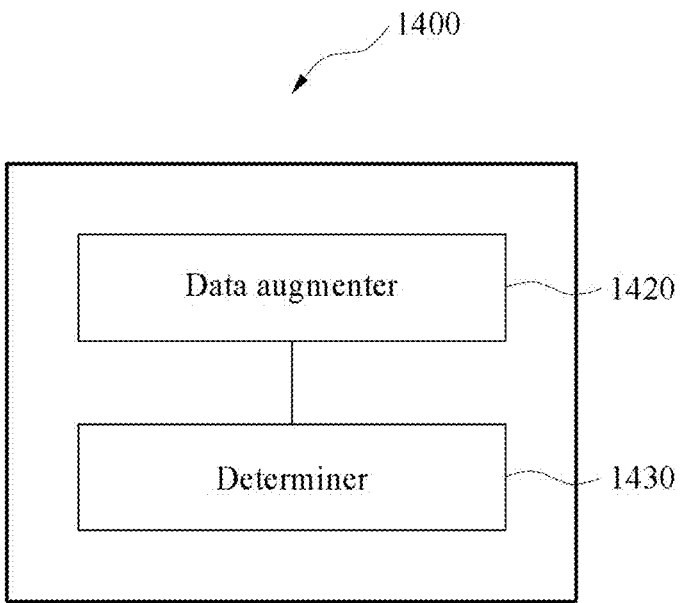
FIG. 14 illustrates an example configuration of an image processing apparatus, according to one or more embodiments.

FIG. 14 illustrates an example configuration of an image processing apparatus, according to one or more embodiments. Referring to FIG. 14, an image processing apparatus 1400 may include a data augmenter 1420 and a determiner 1430. Specifically, the data augmenter 1420 may be configured to obtain N augmented image areas by augmenting data on an image area, using the N data augmentation processing methods, respectively. N may be a positive integer greater than or equal to 1. The determiner 1430 may be configured to determine an optimal augmented image area among N augmented image areas.

The image processing method illustrated in FIG. 13 may be executed by the image processing apparatus 1400 illustrated in FIG. 14, the data augmenter 1420 may execute operation 1310, and the determiner 1430 may execute operation 1320. Therefore, all relevant details related to operations performed by each unit of FIG. 14 may be referred to in the descriptions above and thus are not repeated.

Figure 15:
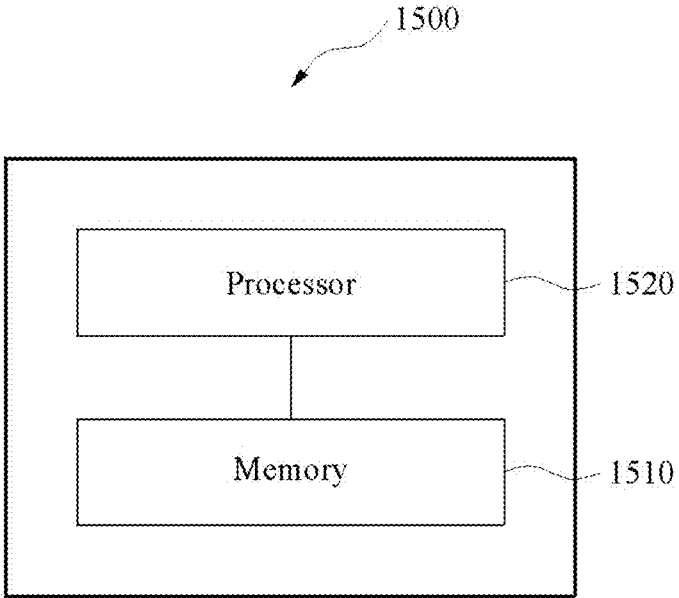
FIG. 15 illustrates an example configuration of an electronic device, according to one or more embodiments.

FIG. 15 illustrates an example configuration of an electronic device, according to one or more embodiments. Referring to FIG. 15, an electronic device 1500 may include at least one memory 1510 and at least one processor 1520. The at least one memory 1510 may store computer-executable instructions. When the computer-executable instructions are executed by the at least one processor 1520, the at least one processor 1520 may execute a target tracking method or an image processing method according to an example.

At least one of the multiple modules described above may be implemented as one or more artificial intelligence (AI) model(s). AI-related functions may be performed by a non-volatile memory, a volatile memory, and a processor.

The processor may include one or more processors. In this case, the one or more processors may be general-purpose processors, such as central processing units (CPUs) and application processors (Aps), and may be graphics-only processors (e.g., graphics processing units (GPUs), video processing units (VPUs), and/or neural processing units (NPUs)).

The one or more processors may control processing of input data according to a predefined operation rule or an AI model stored in a non-volatile memory and a volatile memory. The one or more processors may provide the predefined operation rule or AI model through training or learning. Here, providing the predefined operation rules or AI model through learning may indicate obtaining a predefined operation rule or AI model with desired characteristics by applying a learning algorithm to a plurality of pieces of training data. The training may be performed by a device having an AI function according to the disclosure or by a separate server and/or system.

The learning algorithm may be a method of training a predetermined target device, for example, a robot, based on pieces of training data and of inducing, allowing, or controlling the target device to perform determination or prediction. The learning algorithm may include, but is not limited to, for example, supervised learning, unsupervised learning, semi-supervised learning, or augmented learning.

Target tracking methods and/or image processing methods executed by an electronic device may process an image or obtain output data after tracking a target by using an input image with input data of an AI model.

An AI model may be obtained through training. Here, "being obtained through training" may refer to obtaining the AI model or pre-defined operation rules configured to perform a desired feature (or objective) by training a basic AI model with pieces of training data through a training algorithm.

For example, an AI model may include a plurality of neural network layers. Each of the layers may have a plurality of weight values, and a neural network computation may be performed by a calculation between a calculation result from a previous layer and a plurality of weight values. A neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), a generative adversarial network (GAN), and a deep Q network, but is not limited thereto.

The computing apparatuses, electronic devices, processors, memories, image sensors, displays, information output system and hardware, storage devices, and other apparatuses, devices, units, modules, and components described herein with respect to FIGS. 1-15 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-15 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD- Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A target tracking method, the method comprising:
determining whether data augmentation is to be used to augment a target tracking process;
based on determining that data augmentation is to be used, performing the target tracking process based on an augmented image area obtained by the data augmentation on an image area, wherein the performing of the target tracking process based on the augmented image area comprises:
obtaining N tracking results by performing the target tracking process based on N augmented image areas:
determining a first augmented tracking result by comparing the N tracking results to one another; and
outputting the first augmented tracking result as a tracking result responsive to a first augmentation confidence score included in the first augmented tracking result being within a second preset score interval; and
outputting the tracking result generated by the target tracking process.

2. The method of claim 1, further comprising, outputting, as the tracking result, a first original tracking result obtained from the target tracking process based on the image area, when it is determined that the data augmentation is not to be used.

3. The method of claim 1, wherein the determining the data augmentation is to be used comprises:

obtaining a first original tracking result by performing the target tracking process based on the image area; and
determining whether the data augmentation is to be used according to the first original tracking result.

4. The method of claim 3, wherein the first original tracking result comprises a first original predicted position of a tracked target and a first original confidence score corresponding to the first original predicted position of the tracked target, and
wherein the determining of whether the data augmentation is to be used is based on the first original confidence score.

5. The method of claim 4, wherein the determining of whether the data augmentation is to be used, according to the first original confidence score, comprises:
when the first original confidence score is within a first preset score range, determining that the data augmentation is to be used.

6. The method of claim 1, wherein
the N augmented image areas are obtained by augmenting data on the image area by using N data augmentation processing methods, respectively.

7. The method of claim 6, wherein the outputting of the tracking result further comprises:
outputting a first original tracking result as the tracking result responsive to the first augmented confidence score included in the first augmented tracking result being not within the second preset score interval.

8. The method of claim 7, wherein the image area comprises a template image area comprising a tracked target within a frame image or a search area within the frame image.

9. The method of claim 8, further comprising, when the image area is a first search area positioned in a t-th frame image and the first augmented tracking result is output as the tracking result:
obtaining a second original tracking result corresponding to a second search area of a t+1th frame image by performing the target tracking process based on the second search area;
augmenting data on the second search area through a data augmentation processing method corresponding to the first augmented tracking result;
determining a second augmented tracking result corresponding to the second search area by performing the target tracking based on the augmented second search area; and
determining a final tracking result corresponding to the second search area, from the second original tracking result and the second augmented tracking result.

10. The method of claim 9, further comprising:
when the second augmented tracking result is determined to be the final tracking result corresponding to the second search area, augmenting data on a third search area in a t+2th frame image through the data augmentation processing method corresponding to the first augmented tracking result and determining a third augmented tracking result corresponding to the third search area to be a final tracking result corresponding to the third search area by performing the target tracking process based on the augmented third search area; and
when the second original tracking result is determined to be the final tracking result corresponding to the second search area, determining a final tracking result corresponding to the third image search area by performing the target tracking based on an original third search area.

11. The method of claim 8, further comprising, when the image area is a template image area and the first augmented tracking result corresponding to the first search area in a t-th frame image is output as the tracking result:

obtaining a second original tracking result corresponding to a second search area of a t+1th frame image by performing the target tracking based on the second search area and the template image area;

determining a second augmented tracking result corresponding to the second search area by performing the target tracking based on the second search area and an augmented template image area; and determining a final tracking result corresponding to the second search area, from the second original tracking result and the second augmented tracking result, wherein the augmented template image area is obtained by augmenting data on the template image area through a data augmentation processing method corresponding to the first augmented tracking result.

12. The method of claim 11, further comprising:

when the second original tracking result is determined to be the final tracking result corresponding to the second search area, determining a final tracking result corresponding to a third search area in a t+2th frame image by performing the target tracking process based on the third search area and the template image area; and when the second augmented tracking result is determined to be the final tracking result corresponding to the second search area, determining the final tracking result corresponding to the third search area by performing the target tracking process based on the third search area and the augmented template image area.

13. The method of claim 6, wherein the N augmented image areas are obtained by augmenting data on the image area, using the N data augmentation processing methods, respectively, through obtaining an augmented image area corresponding to the image area by augmenting the image area, using augmentation chains for each of the N data augmentation processing methods, respectively.

14. The method of claim 13, wherein the obtaining of the augmented image area corresponding to the image area by augmenting the image area using the augmentation chains comprises:

performing an augmentation processing on the image area using each augmentation chain; and obtaining the augmented image area corresponding to the image area by performing weighted combination output results of the respective augmentation chains.

15. The method of claim 14, wherein at least one of the augmentation chains is randomly selected from among augmentation chain candidates.

16. The method of claim 15, wherein each of the augmentation chain candidates is linked to at least one augmentation primitive among a plurality of augmentation primitives.

17. The method of claim 16, wherein the augmentation primitives comprise a contrast primitive, a color primitive, a brightness primitive, a sharpness primitive, a clipping primitive, a blur primitive, and a translation primitive.

18. An image processing method, the method comprising:

obtaining N augmented image areas by augmenting data on an image area of an image, using N data augmentation processing methods, respectively; and selecting a target image area among the N augmented image areas, according to a preset criterion; and performing target tracking based on the target image area, wherein the performing of the target tracking process based on the augmented image area comprises:

obtaining N tracking results by performing the target tracking process based on N augmented image areas;

determining a first augmented tracking result by comparing the N tracking results to one another; and outputting the first augmented tracking result as a tracking result responsive to a first augmentation confidence score included in the first augmented tracking result being within a second preset score interval; and outputting the tracking result generated by the performing the target tracking.

19. A target tracking apparatus comprising:

one or more processors;

storage hardware storing instructions configured to, when executed by the one or more processors, cause the one or more processors to:

determine whether a target tracking process is to be augmented with data augmentation;

when determined that the data augmentation is to be used, perform the data augmentation on an image area of an image; and perform the target tracking process based on an augmented image area obtained by the data augmentation, wherein the performing of the target tracking process based on the augmented image area comprises:

obtaining N tracking results by performing the target tracking process based on N augmented image areas;

determining a first augmented tracking result by comparing the N tracking results to one another; and outputting the first augmented tracking result as a tracking result responsive to a first augmentation confidence score included in the first augmented tracking result being within a second preset score interval; and output the tracking result of the target tracking process.

* * * * *